United States Patent
Hashimoto et al.

[11] Patent Number: 6,157,768
[45] Date of Patent: Dec. 5, 2000

[54] RECORDING/REPRODUCING APPARATUS AND INFORMATION MEDIUM TRANSFER METHOD

[75] Inventors: Yoshiyuki Hashimoto; Shigeto Ueno, both of Osaka, Japan

[73] Assignee: Matsushita Electric Industrial Co., Ltd., Osaka, Japan

[21] Appl. No.: 09/495,571

[22] Filed: Feb. 1, 2000

[30] Foreign Application Priority Data

Feb. 3, 1999 [JP] Japan .................................. 11-025841

[51] Int. Cl.⁷ .............................. H04N 5/76; H04N 5/781
[52] U.S. Cl. .............................................. 386/46; 386/125
[58] Field of Search .................................. 369/30, 32, 33, 369/36, 47, 48, 49, 50, 54, 58; 360/69, 71, 131, 135, 91, 92, 93, 97.01, 95, 98.01, 98.04, 98.05; 386/125, 126; H04N 5/76, 5/78, 46/11

[56] References Cited

U.S. PATENT DOCUMENTS

| | | | |
|---|---|---|---|
| 5,446,714 | 8/1995 | Yoshio et al. | 369/32 |
| 5,504,873 | 4/1996 | Martin et al. | 360/98.04 |
| 5,581,786 | 12/1996 | Saito et al. | 360/98.04 |
| 5,675,446 | 10/1997 | Kosugi et al. | 360/69 |
| 5,689,484 | 11/1997 | Hirasawa | 369/33 |

*Primary Examiner*—Thai Tran
*Attorney, Agent, or Firm*—Merchant & Gould P.C.

[57] ABSTRACT

A recording/reproducing apparatus in accordance with the present invention includes a plurality of recording and/or reproducing units for performing at least one of recording an information signal and reproducing an information signal; a medium transfer unit for transferring an information medium and loading it selectively into the recording and/or reproducing unit; a selection unit for selecting the recording and/or reproducing unit to be loaded with the information medium by the medium transfer unit. The selection unit selects the recording and/or reproducing units with the currently shortest usage history from the plurality of recording and/or reproducing units. With this configuration, the usage frequency of the recording and/or reproducing units used for recording or reproducing can be equalized.

6 Claims, 8 Drawing Sheets

RECORDING/REPRODUCING APPARATUS AND INFORMATION MEDIUM TRANSFER METHOD

BACKGROUND OF THE INVENTION

1. Field of the Invention

The present invention relates to a recording/reproducing apparatus having a plurality of recording and/or reproducing means for performing at least one of recording and reproducing with an information medium, and to an information medium transfer method for transferring a medium into the recording and/or reproducing means.

2. Description of the Prior Art

An example of such a recording/reproducing apparatus includes a plurality of recording/reproducing means, a medium stocking means (also called a stocker) for stocking a plurality of information media such as optomagnetic disks (so-called MDs), audio or video cassettes storing a tape-shaped magnetic recording medium in a cassette, or optical disks (so-called CDs and LDs), and a medium transfer means (so-called carrier) for selectively transferring a desired recording medium from the stocker to a certain recording/reproducing means.

The following is an explanation of a typical structure of such a recording/reproducing apparatus and the operation of transferring an information medium from the stocker to the recording/reproducing apparatus, with reference to FIGS. 6 to 8.

FIG. 6 is a schematic block diagram showing an example of the above-described recording/reproducing apparatus. A recording/reproducing apparatus 1 includes a stocker 3 for stocking information media 2, a first recording/reproducing means 4, a second recording/reproducing means 5, and a carrier 6. The carrier 6 transfers the information media 2 up and down or to the left and to the right towards the first recording/reproducing means 4 and the second recording/reproducing means 5 inside the recording/reproducing apparatus, and loads the information media 2 into the desired recording/reproducing means 4 or 5.

The operation of such a recording/reproducing apparatus 1 is explained with reference to the flowchart shown in FIG. 7. First, the desired information medium 2 is moved from the stocker 3 to the carrier 6 (Step S701). Then, the carrier 6 is moved to the height of the second recording/reproducing means 5 (Step S702), and the information medium 2 is loaded from the carrier 6 into the second information recording/reproducing means (Step S703). In the second recording/reproducing means 5, the recording/reproducing of the information medium 2 is performed (Step S704), and after the recording/reproducing is terminated (Step S705), the information medium 2 is moved from the second recording/reproducing means 5 to the carrier 6 (Step S706). Then the carrier 6 is moved to the height of the stocker 3 (Step S707), and the information medium 2 is moved from the carrier 6 to the stocker 3 (Step S708).

This operation sequence is performed with the control means as shown in FIG. 8, operating the carrier 6 to transfer the information medium 2 from the stocker 3, and randomly loading it with a selection means 6b into the first recording/reproducing means 4 or the second recording/reproducing means 5 to perform recording/reproducing.

There are also recording/reproducing apparatuses having a plurality of recordable information media, and first and second recording/reproducing means for recording/reproducing information, which select an information medium for recording information with an external controlling means such as a computer.

However, when information media are recorded/reproduced with a recording/reproducing apparatus as shown for example in FIG. 6, there is generally no criterion for deciding which recording/reproducing means of the plurality of recording/reproducing means should be used. Therefore, the use concentrates on always the same recording/reproducing means, which leads to the problem that one of the plurality of recording/reproducing means wears down faster than the others, thereby shortening the lifetime of the entire apparatus.

Also in the case of recording/reproducing apparatuses where an external controlling means instructs the selection out of a plurality of information media, such an instruction is not more than the selection of an information medium based on the remaining capacity for recording information. Consequently, it does not solve the problem of using one recording/reproducing means more than the others when recording/reproducing with these information media. Moreover, even if the external control means has the function to control the recording/reproducing apparatus and the instructions from the external controlling means include specifics on the recording and reproducing means into which the information medium is loaded, if the selection criterion is simply the usage order of the recording/reproducing means, and if there are differences in the amount of information recorded/reproduced in one recording/reproducing operation, these differences accumulate. Moreover, if the external controlling means is exchanged or disconnected, the information determining the recording/reproducing means with which a recording should be performed is lost, and the problem remains that a certain recording/reproducing means is used more than the others.

If, for example, a backup of data accumulated on a computer's hard disk is made with such a conventional recording/reproducing apparatus, after the long processing time for the backup, there can be the problem that failures of the backup processing occur due to some trouble with the recording/reproducing apparatus. Or, if recording is performed due to the programming, recording of the programmed programs fails due to some trouble with the recording/reproducing apparatus.

SUMMARY OF THE INVENTION

It is an object of the present invention to solve these problems, and to extend the product lifetime of a recording/reproducing apparatus having a plurality of recording/reproducing means by operating them in accordance with their usage frequency.

A recording/reproducing apparatus in accordance with the present invention includes a plurality of recording and/or reproducing means for performing at least one of recording an information signal and reproducing an information signal; a medium transfer means for transferring an information medium and loading it selectively into one of the recording and/or reproducing means; and a selection means for selecting the recording and/or reproducing means to be loaded with the information medium by the medium transfer means. The selection means selects the recording and/or reproducing means with the currently shortest usage history from the plurality of recording and/or reproducing means.

With this configuration, the usage frequency of the recording and/or reproducing means used for recording or reproducing can be equalized, and the lifetime of the entire recording/reproducing apparatus can be prolonged up to the combined lifetime of all recording and/or reproducing means. That is to say, it can be avoided that the lifetime of the entire recording/reproducing apparatus is limited to the lifetime of one recording and/or reproducing means due to the fact that this one recording and/or reproducing means is used more than the other recording and/or reproducing means.

In this configuration, it is preferable that the apparatus is provided with a storage means (memory) for storing a usage history of each of the recording and/or reproducing means. With this configuration, information media can be transferred appropriately and without losing the usage history of the recording and/or reproducing means included in the recording/reproducing apparatus, even when the usage environment of the recording/reproducing apparatus is changed, for example, by moving the recording/reproducing apparatus or diversification of the information input/output means.

It is preferable that the recording/reproducing apparatus further includes a judgement means for judging, based on usage histories stored in the storage means, which recording and/or reproducing means is to be selected with the selection means. With this configuration, a selection of the optimal recording and/or reproducing means can be guaranteed even when the usage environment of the recording/reproducing apparatus is changed, for example, by moving the recording/reproducing apparatus or diversification of the information input/output means, and the combined lifetime of the plurality of recording and/or reproducing means can be utilized effectively and reliably by the recording/reproducing apparatus itself.

In such a recording/reproducing apparatus, the usage history can be divided into recording history and reproducing history independently. In this case, it is possible to provide a function for selecting, from the plurality of recording and/or reproducing means, means suitable for recording and means suitable for reproducing as appropriate, and if recording and reproducing are performed simultaneously to copy information is from one information medium to another information medium, suitable recording and/or reproducing means.

It is preferable that the recording/reproducing apparatus further includes a medium stocking means for stocking a plurality of information media; and a moving means for moving one desired information medium of the plurality of information media from the medium stocking means to the medium transfer means. With this configuration, the lifetime of the recording/reproducing apparatus can become the combined lifetime of the recording and/or reproducing means, while increasing the information amount that can be handled by one recording/reproducing apparatus. Consequently, a recording/reproducing apparatus with a longer lifetime can be achieved, which can store large amounts of information.

It is preferable that the recording/reproducing apparatus further includes a medium selection means for selecting, from the medium stocking means, an information medium used for recording certain information with a selected recording and/or reproducing means, the selecting being in accordance with a kind of the information. With this configuration, a suitable information medium can be selected from the medium stocking means, in accordance with the kind of information signal to be recorded (for example, depending on whether the information signal to be recorded consists of audio signals only or includes video information), the length of the information signal (for example, the program time when programming the record-ing of audio or video), or the field of the information (for example, information relating to entertainment or business). Consequently, it can be avoided that a single piece of information is recorded spanning a plurality of information media, and the information medium can be selected suitably depending on the information signal.

An information medium transfer method in accordance with the present invention is intended to transfer an information medium to load it selectively into one of a plurality of recording and/or reproducing means for performing at least one of recording an information signal and reproducing an information signal. The method includes a step of comparing, with a usage history judgement means, usage histories obtained from a storage means for storing usage histories of the recording and/or reproducing means; a step of selecting, with a selection means, one of the plurality of recording and/or reproducing means, which the usage history judgement means has judged to have the shortest usage history; and a step of transferring the information medium with a transfer means to the recording and/or reproducing means selected with the selection means.

With this method, the lifetime of a recording/reproducing apparatus including a plurality of recording and/or reproducing means can be increased, because information media are transferred equally to the plurality of recording and/or reproducing means.

DESCRIPTION OF THE PREFERRED EMBODIMENTS

The following is an explanation of an example of a recording/reproducing apparatus according to the present invention having two recording and/or reproducing means (called "recording/reproducing means" in the following), with reference to FIGS. 1 to 5. Needless to say, the same approach can also be used for apparatuses provided with three or more recording/reproducing means.

Figure 1:
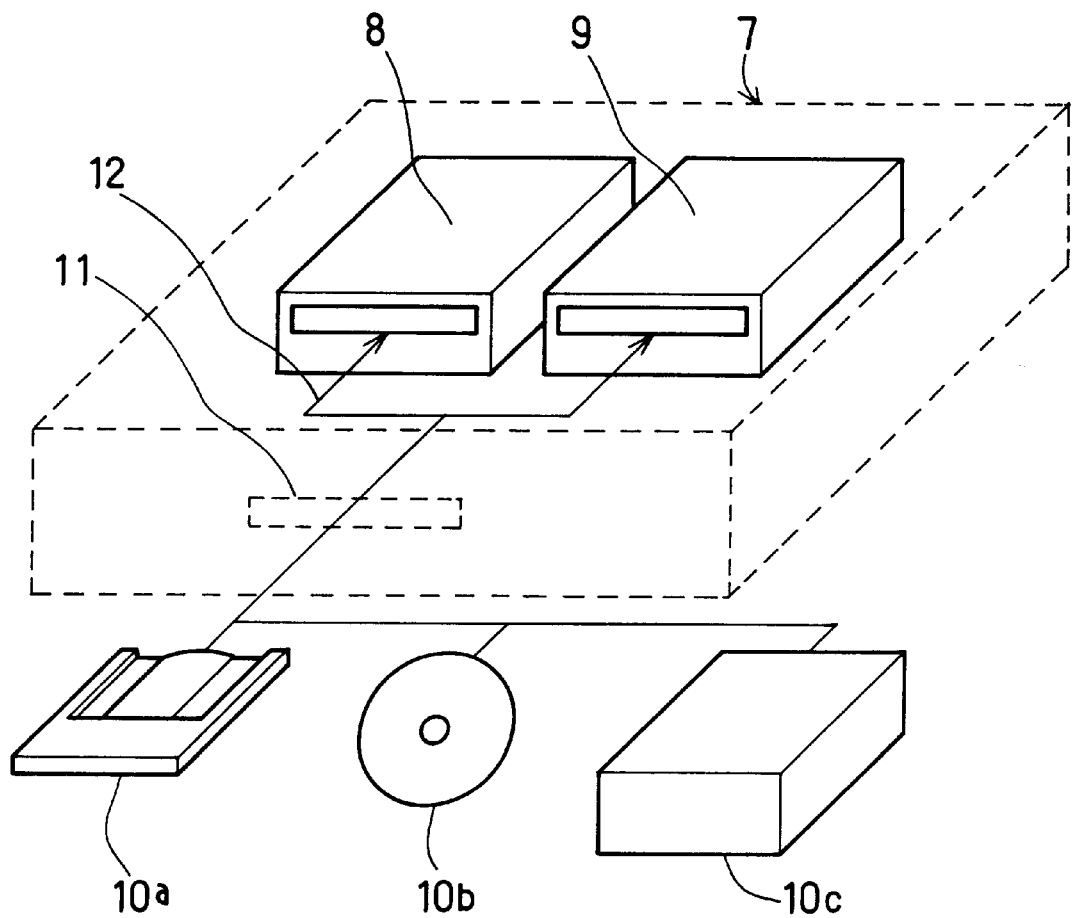
FIG. 1 is a schematic drawing of a recording/reproducing apparatus in accordance with one embodiment of the present invention.

FIG. 1 is a schematic drawing of a recording/reproducing apparatus in accordance with one embodiment of the present invention. A recording/reproducing apparatus 7 has a first recording/reproducing means 8 and a second recording/reproducing means 9. The first recording/reproducing means 8 and the second recording/reproducing means 9 can be loaded for recording or reproducing with information media 10a, 10b or 10c. The information medium 10a may be, for example, a recordable/reproducible information medium such as a DVD-RAM. The information medium 10b may be a read-only information medium based on the recording/reproducing principle similar to the information medium 10a, such as a CD-ROM. The information medium 10c may be a recordable/reproducible information medium based on a recording/reproducing principle different from the information medium 10a, such as an audio cassette tape or a video cassette tape. The information media 10a, 10b, or 10c is loaded selectively to the first recording/reproducing means 8 or the second recording/reproducing means 9 which is suitable for the medium with respect to the recording/reproducing principle. If the first recording/reproducing means 8 or the second recording/reproducing means 9 is adapted to record or reproduce all of the information media 10a, 10b, and 10c based on the recording/reproducing principles different from each other, each of the information media can be loaded to the same recording/reproducing means. The information media 10a, 10b, or 10c is inserted through an insertion port 11 into a media transfer means 12. Either the first recording/reproducing means 8 or the second recording/reproducing means 9 is selected with a selection means described below. The media transfer means 12 transfers the information media 10a, 10b, or 10c into the selected first or second recording/reproducing means 8 or 9, which perform recording or reproducing. After the recording or reproducing is finished, the information medium can be retrieved from the selected recording/reproducing means, if necessary.

Figure 2:
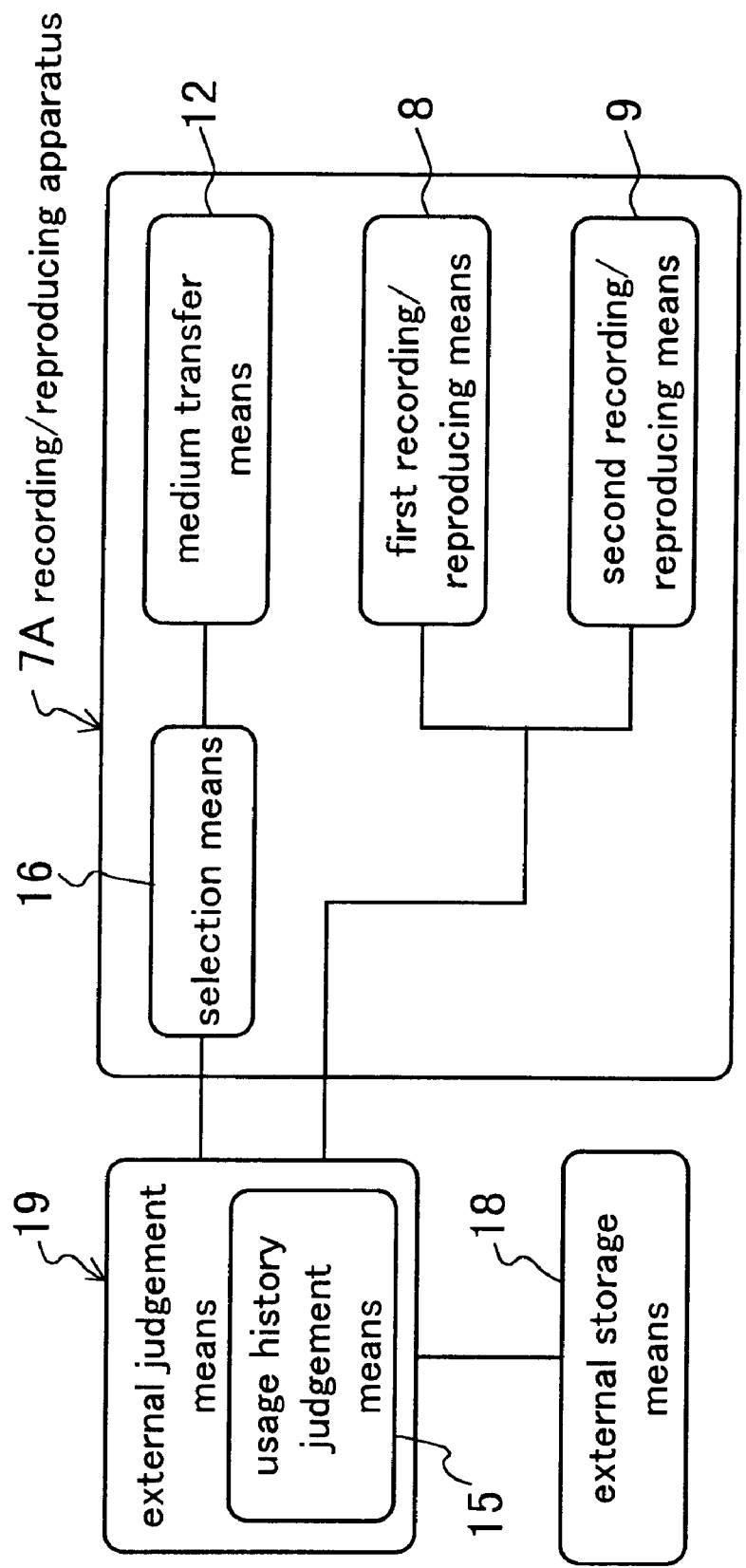
FIG. 2 is a block diagram illustrating the transfer control in a recording/reproducing apparatus of an embodiment of the present invention.
Figure 3:
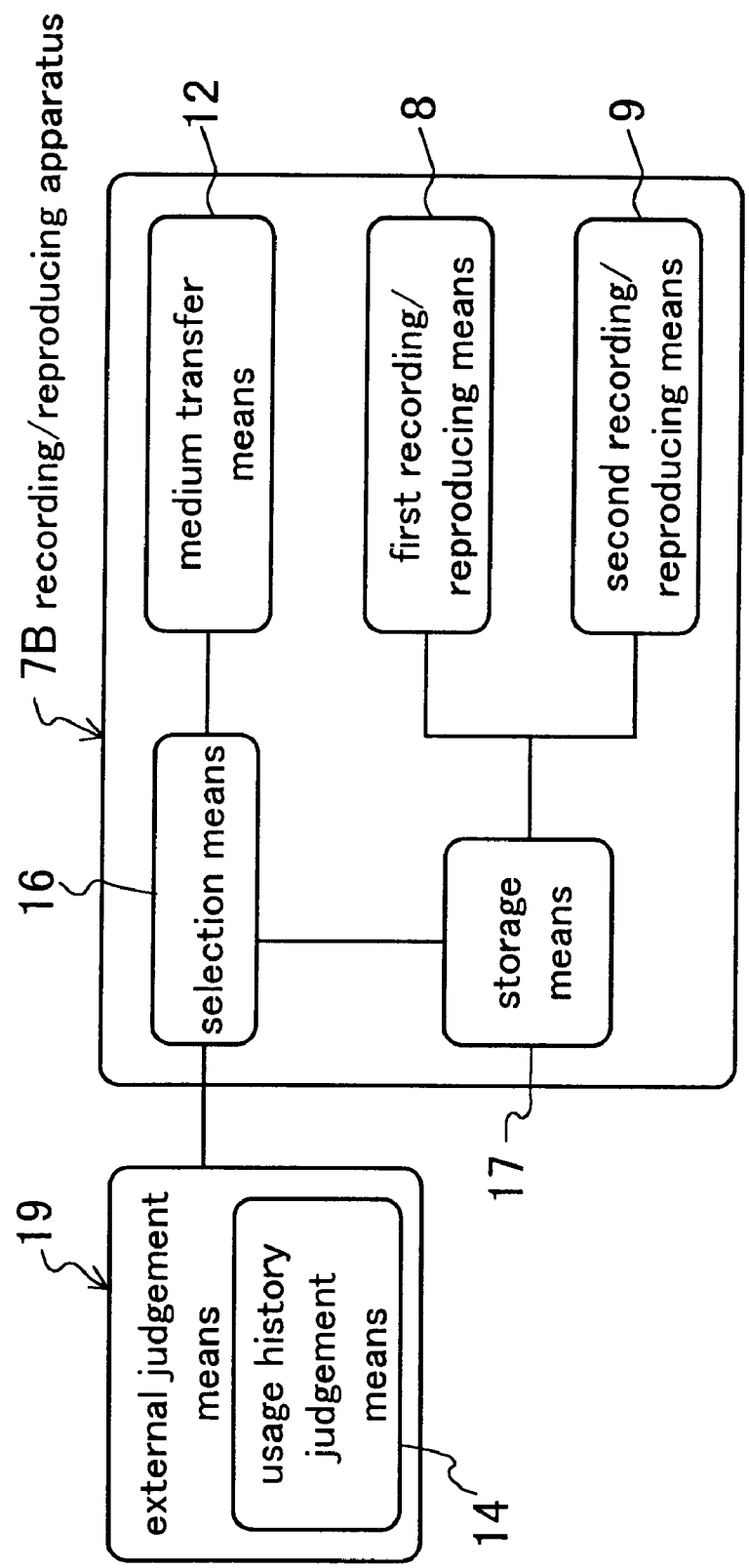
FIG. 3 is a block diagram illustrating the transfer control in a recording/reproducing apparatus of another embodiment of the present invention.
Figure 4:
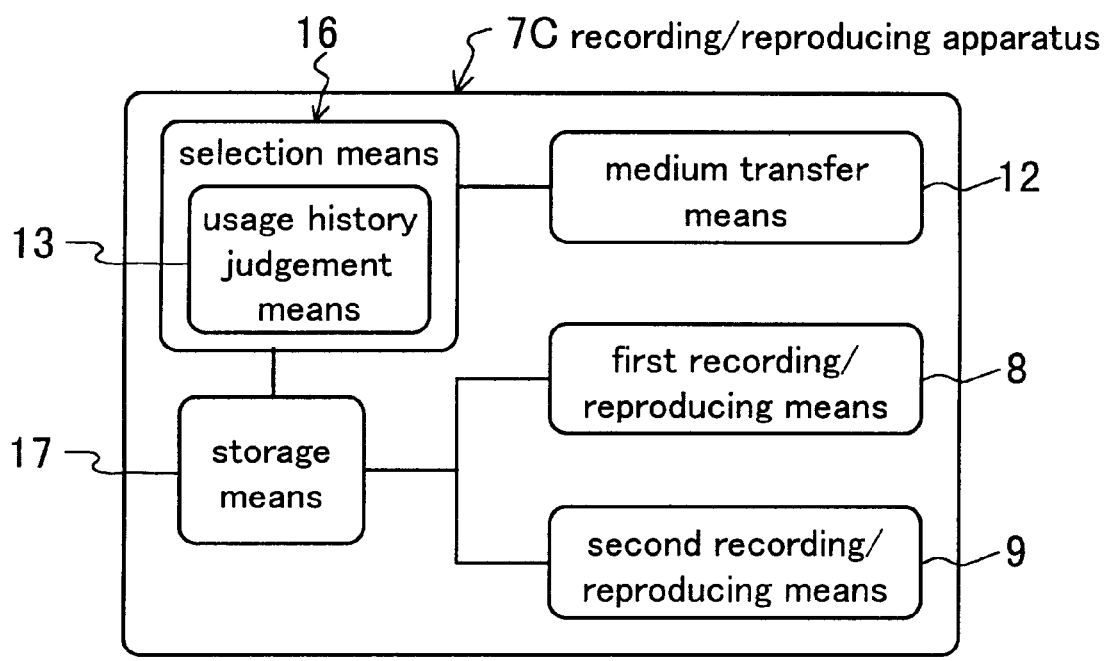
FIG. 4 is a block diagram illustrating the transfer control in a recording/reproducing apparatus of yet another embodiment of the present invention.

With this embodiment, the structures shown in FIGS. 2, 3 and 4 can be used to control the operation of the recording/reproducing apparatus.

In the configuration of the recording/reproducing apparatus 7A shown in FIG. 2, the usage history of the first recording/reproducing means 8 and the second recording/reproducing means 9 is stored in an external storage means 18, through an external judgement means 19. Whenever a certain information medium is used for recording or reproducing with the recording/reproducing apparatus 7A, a usage history signal stored in the external storage means 18 is entered into a usage history judgement means 15 included in the external judgement means 19. A recording/reproducing means selection signal is entered from the usage history judgement means 15 into a selection means 16 in the recording/reproducing apparatus 7A. Based on the recording/reproducing means selection signal, the selection means 16 selects either the first recording/reproducing means 8 or the second recording/reproducing means 9 to perform recording or reproducing with the information medium, and transfers the information medium to the medium transfer means 12.

The advantage of the recording/reproducing apparatus 7A in FIG. 2 is the fact that it has a selection means 16, which selects the recording/reproducing means with the shorter usage history based on the prior usage history of the recording/reproducing means. This equalizes the usage frequency of the first recording/reproducing means 8 and the second recording/reproducing means 9. Consequently, the problem is solved that using one of the recording/reproducing means more than the others leads to a restriction of the lifetime of the recording/reproducing apparatus 7A to the lifetime of the recording/reproducing means (8 or 9) used most, and is shortened.

Thus the external judgement means 19 is composed of a circuit having the function to receive the usage history of the first recording/reproducing means 8 and the second recording/reproducing means 9, the function to output the usage history as a signal to the external storage means 18, where it is accumulated, and the function to enter a judgement signal of the usage history judgement means 15 into the selection means 16.

If there is the possibility that the external judgement means 19 and the external storage means 18 are disconnected from the recording/reproducing apparatus 7 and the usage history of the recording/reproducing means 8 and 9 is damaged, then, the usage history can be compensated as follows: For example, when a new external judgement means 19 and a new external storage means 18 have been connected to the recording/reproducing apparatus 7A, a dummy signal is sent to the first recording/reproducing means 8 and the second recording/reproducing means 9. The dummy signal causes them to perform pseudo-recording or pseudo-reproducing. Thereby the usage histories of the first recording/reproducing means 8 and the second recording/reproducing means 9 are guessed and the guessed information is newly stored in the external storage means 18 connected to the recording/reproducing apparatus 7. Thus the previously described operation is performed.

The pseudo-recording or pseudo-reproducing is not an actual recording or reproducing, but it is an operation for causing a laser diode to emit light for detecting a relation between electric current supplied to the laser diode and power of the emitted light. Based on change of the relation, the usage history of the recording/reproducing means can be guessed. In order to do so, the power of the emitted light is monitored, while a predetermined electric current is supplied to the laser diode. Or, the electric current supplied to the laser diode is monitored, while the power of the emitted light is kept at a predetermined value. Also a relation between a current supplied to a disk motor and a rotation speed thereof may be used for guessing the usage history.

Since the above-mentioned method using pseudo-recording requires sequential operation of a plurality of the recording/reproducing means, it takes a long time to guess the usage history. The usage history can be guessed more simply, for example, by the following methods using the selection means 16.

Before inserting the information medium, the recording/reproducing means selected by the selection means 16 is decided beforehand based on the preceding operation, and the information medium is recorded or reproduced with the recording/reproducing means that has been preliminarily decided. In order to do so, when the external storage means 18 have been disconnected, information about a state of the preceding operation is held by, for example, some mechanical element such as relay. The usage history of the selected recording/reproducing means is guessed and stored in the external storage means. For the recording or reproducing of another information medium, the selection means 16 selects the other recording/reproducing means, and recording or reproducing is performed with this other recording/reproducing means. When the recording or reproducing is finished, the usage history of this other recording/reproducing means is guessed and stored in the external storage means 18. For the recording or reproducing of still another information medium, the usage history judgment means 15 compares the guessed usage histories stored in the external storage means and send the resultant signal to the selection means 16, so that the recording or reproducing is performed with the suitable recording/reproducing means.

In FIG. 2, the input path of the usage history signal into the external storage means 18 is shown as going through the external judgement means 19, but it is also possible that the usage history signal is entered directly from the recording/reproducing apparatus 7A into the external storage means 18.

FIG. 3A is a block diagram showing a recording/reproducing apparatus 7B in accordance with another embodiment of the present invention. The difference from the embodiment shown in FIG. 2 is that the recording/reproducing apparatus 7B includes a storage means 17 for accumulating the usage history of the first recording/reproducing means 8 and the second recording/reproducing means 9. By sending the usage history accumulated by the storage means 17 to a usage history judgement means 14 included in the external judgement means 19, the recording/reproducing means for recording or reproducing the information medium is determined, and a corresponding instruction is given out to the selection means 16.

By providing a storage means 17 inside the recording/reproducing apparatus 7B, loss of the usage history of the first recording/reproducing means 8 and the second recording/reproducing means 9 can be prevented, when the connection between an external judgement means 19, that includes the usage history judgement means 14 and the recording/reproducing apparatus 7 is cut. Consequently, it is not necessary to guess the usage information as explained for FIG. 2.

Thus the external judgement means 19 shown in FIG. 3 is composed of a circuit having the function to input the usage history of the first recording/reproducing means 8 and the second recording/reproducing means 9 accumulated by the storage means 17 into the usage history judgement means 14, and the function to input a judgement signal of the usage history judgement means 14 into the selection means 16.

FIG. 4 is a block diagram showing a recording/reproducing apparatus 7C according to yet another embodiment of the present invention. The difference versus the embodiments shown in FIGS. 2 and 3 is that the recording/reproducing apparatus 7C includes a storage means 17 for accumulating the usage history of the first recording/reproducing means 8 and the second recording/reproducing means 9, and a usage history judgement means 13. Thus, the functions of the external judgement means 19 in the configuration of FIGS. 2 or 3 can be fulfilled by the selection means 16.

With the recording/reproducing apparatus 7C shown in FIG. 4, all the functions of the embodiments shown in FIGS. 2 and 3 can be completed inside the recording/reproducing apparatus 7C, which raises its reliability as a recording/reproducing apparatus. Moreover, by integrating the functions of the judgement means into the selection means 16 as shown in FIG. 4, the circuit serving as the judgement means can be eliminated, which leads to the advantages of miniaturization and cost reduction.

The recording/reproducing apparatuses 7A, B, and C of the present invention as explained with the FIGS. 2 to 4 can be selected and used in accordance with their usage conditions.

In the embodiments of FIGS. 2 to 4, it is preferable that the usage history of the recording/reproducing means stored in the external storage means 18 or the storage means 17 is divided into recording history and reproduction history of the recording/reproducing means. If the usage history is divided in this manner, the usage history judgement means 13, 14, or 15 may be configured so as to give the instruction whether a certain information medium is recorded or reproduced, to the selection means 16. Thereby the selection means 16 can select a recording/reproducing means with a usage history that is suitable for recording or a recording/reproducing means with a usage history that is suitable for reproducing. Consequently, the life-time of the recording/reproducing apparatus can be prolonged to the recording limit and the reproduction limit of the recording/reproducing means. Moreover, if the information on an information medium is copied onto another information medium (this copying operation is called "dubbing"), a recording/reproducing means that is optimal for reproduction and a recording/reproducing means that is optimal for recording can be selected, which enhances the reliability of the copying operation.

Figure 6:
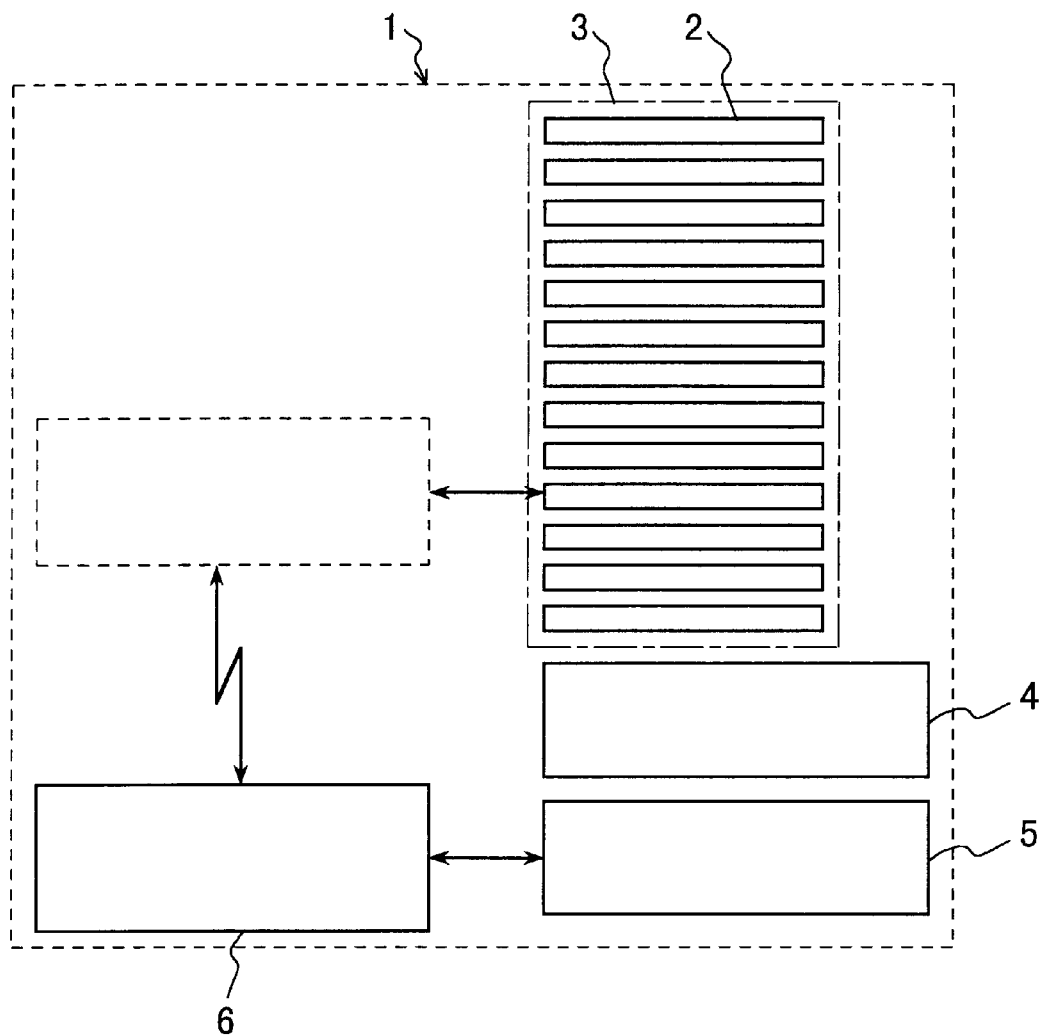
FIG. 6 is a block diagram showing the configuration of a conventional recording/reproducing apparatus.
Figure 7:
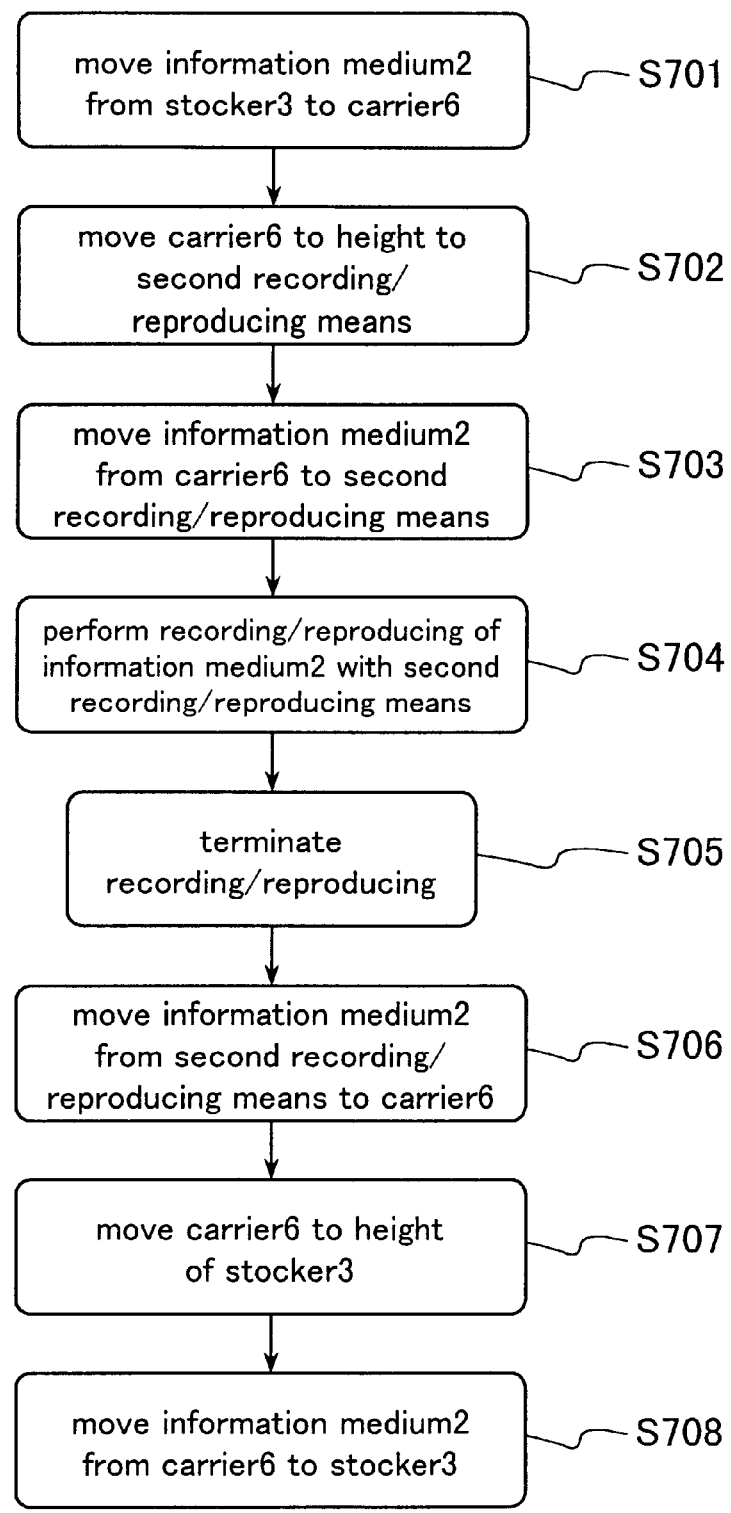
FIG. 7 is a flowchart of the transfer operation in a conventional recording/reproducing apparatus.
Figure 8:
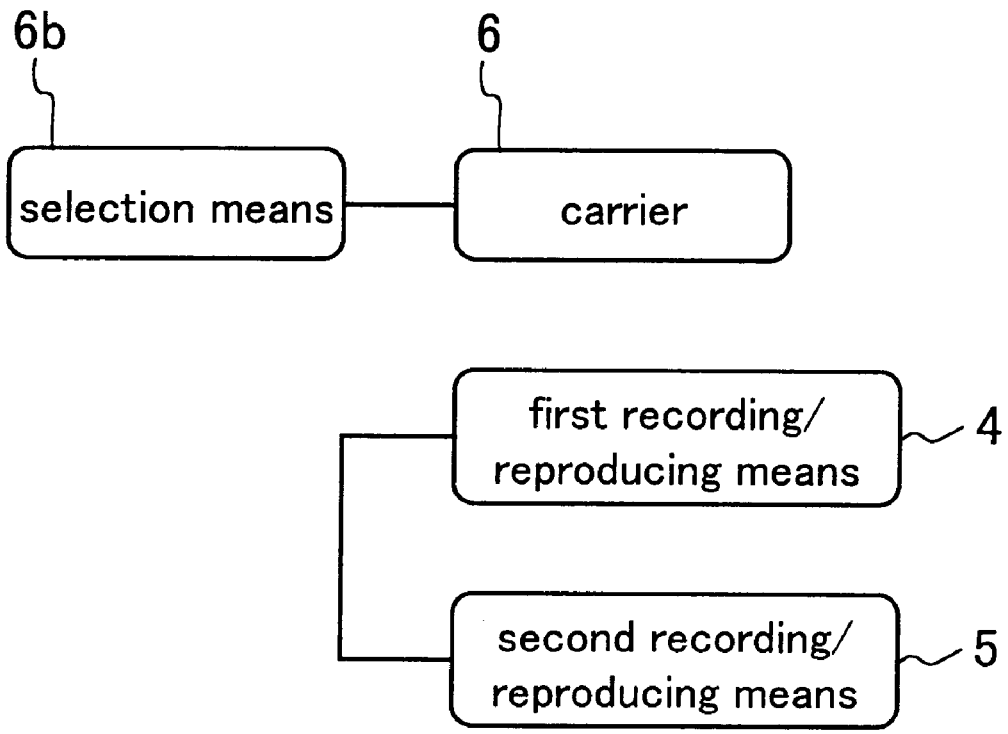
FIG. 8 is a block diagram illustrating a transfer control in a conventional recording/reproducing apparatus.

It is also possible to add to the recording/reproducing apparatus of the above-described embodiments a stocker 3 as shown in FIG. 6, which is a medium stocking means for stocking a plurality of information media. By employing a system in which after a moving means (not shown in the drawings) has moved a certain information medium from the stocker to the transfer means 12, the information medium is transferred to the recording/reproducing means selected by the selection means 16, the recording and/or the reproducing lifetime of a recording/reproducing apparatus handling large amounts of information on a plurality of information media can be extended. Therefore the information media stocked in the medium stocking means can be used more effectively. Needless to say, instead of using the selection means after the moving means, it is also possible to use the moving means after the selection means.

Moreover, when recording on an information medium stocked in the medium stocking means, a media selection means can be provided for selecting the information medium in accordance with the information signal to be recorded. By doing so, in addition to all the above-mentioned effects, it is possible to select an information medium that has, for example when programming the apparatus to record audio or video, an empty information region that corresponds to the programmed time. Thus, it becomes possible to record the entire programmed information signals, and the inconvenience of spanning several information media can be avoided. Or, if the information signal to be recorded is only audio, it is possible to select an information medium that is used only for audio, avoiding information media that can also record images and video. Moreover, to edit and copy an information medium that has been recorded with a recording/reproducing apparatus not in accordance with the present invention onto another information medium using a recording/reproducing apparatus in accordance with the present invention, it is possible to edit preferably using information media classified according to kinds of information. Consequently, large amounts of information can be managed systematically. Furthermore, it is also possible to add to the media selection means a media verification function to verify whether the regions in the information medium to be recorded can be recorded properly. This is preferable, because recording errors can be avoided, for example, when recording important information, or when recording a program one-sidedly. Moreover, if an information medium is selected based on information with regard to the information medium as described above, it is preferable to provide a medium information storage means for storing attributes and empty capacity of the information media stocked in the medium stocking means.

The difference between the embodiments of the present invention and a conventional configuration including the function of selecting a medium based on an instruction with, for example, a computer, is that in a recording/reproducing apparatus of the present invention, the medium selection means is provided inside the apparatus, whereas conventional configurations are operated by instructions from external control means and do not include medium selection means inside the recording/reproducing apparatus. Consequently, as mentioned above, in conventional configurations, the selection depends only on the empty capacity, and it is essential to provide the external control means with a medium selection instruction function. On the other hand, in the configuration of the present invention, the recording/reproducing apparatus can automatically select the optimal information medium, so that the user can select and record the optimal information medium simply by entering attributes (such as class or origin) of the information signal to be recorded into the recording/reproducing apparatus. In other words, with the recording/reproducing apparatus of the present invention, for example in case of programming a video recording, an information medium that records one kind of information can be produced simply by entering information such as date, day of the week, and program genre. Consequently, the access time necessary when reproducing this information can be shortened, and the information can be recorded neatly sorted on the information media.

Thus, with the recording/reproducing apparatus of the present invention, a plurality of recording/reproducing means or a plurality of information media stocked in a medium stocking means can be used even if their recording principle, reproducing principle, recording/reproducing principle, format, or amount of information on the medium is different and regardless of whether they use a cartridge or not. This means that if, for example, two types of recording/reproducing means, such as an optical disk reproducing means dedicated to reproducing CDs and LDs and a CD/LD reproducing DVD recording/reproducing means, are used, then the latter can be for recording/reproducing DVDs and the former can be used primarily for reproducing CDs or LDs, and after the former has reached its lifetime, reproduction can still be performed with the latter. However, regarding the main point of the present invention, it is preferable that it is provided with at least two recording/reproducing means of the same recording and/or reproducing principle.

The following is an explanation of how in the recording/reproducing apparatus of the present invention based on the content of the usage history, the recording/reproducing means with the shortest usage history is selected from the plurality of recording/reproducing means, and the information medium is transferred to the selected recording/reproducing means.

First of all, as an example of the content of the usage history in a recording/reproducing apparatus of the present invention, the following wear evaluation value L is used. The wear evaluation value L of the first recording/reproducing means, for example, is expressed as follows. When $L_{in}1$ is the wear evaluation value of the tray transfer mechanism, $k_{in}1$ is the wear factor of the tray transfer mechanism, and $n_{in}1$ is the total number of tray transfers, then $L_{in}1=k_{in}\times n_{in}1$. When $L_{ld}1$ is the wear evaluation value of the laser diode, $k_{ldr}1$ is the recording wear factor of the laser diode, $t_{ldr}1$ is the entire recording time, $k_{ldp}1$ is the reproducing wear factor, and $t_{ldp}1$ is the total reproducing time, then $L_{ld}1=k_{ldr}1 \times t_{ldr}1+k_{ldp}1\times t_{ldp}1$. When $L_{dm}1$ is the wear evaluation value of the disk motor, $k_{dmst}1$ is the start/stop wear factor of the disk motor, $n_{dmst}1$ is the total number of times of starts and stops, $k_{dmro}1$ is the rotation wear factor of the disk motor, and $t_{dmro}1$ is the total rotation time, then $L_{dm}1=k_{dmst}1\times n_{dmst}1+k_{dmro}1\times t_{dmro}1$.

The above evaluation factors are merely examples, and it is equally possible to devise evaluation factors for the other structural elements of the recording/reproducing means (for example the traverse mechanism of the head, the focus/tracking mechanism, etc.). Of these wear evaluation factors L for the recording/reproducing means, the evaluation factors L to be applied are selected as suitable, the wear factors are set for all recording/reproducing means using the selected L, and the usage history can be established by updating the wear evaluation values every time a recording/reproducing means is used. It should be noted that a method can be applied where the laser diode wear evaluation value is separated into a laser diode recording wear evaluation value and a laser diode reproducing evaluation value. It is also possible to use wear factors for recording, reproducing and deleting, separately or in combination.

Similar to the above-described manner which is for the case of optical disk recording/reproducing means, the wear evaluation value of a magnetic recording/reproducing means using an audio or video tape is expressed by the following manner. The magnetic recording/reproducing means is positioned as the second recording/reproducing means. When $L_{mh}2$ is the wear evaluation value of a magnetic head, $k_{mh}2$ is the recording wear factor (based on physical wear) of the magnetic head, $t_{mhr}2$ is the entire recording time, and $t_{mph}2$ is the total reproducing time, then $L_{mh}2=k_{mh}2\times(t_{mhr}2+t_{mph}2)$. When $L_{tm}2$ is the wear evaluation value of a tape driving motor, $k_{tmst}2$ is the start/stop wear factor of the tape driving motor, $n_{tmst}2$ is the total number of times of starts and stops, $k_{tmro}2$ is the rotation wear factor of the tape driving motor, and $t_{tmro}2$ is the total rotation time, then $L_{tm}2=k_{tmst}2\times n_{tmst}2+k_{tmro}2\times t_{tmro}2$.

The above evaluation factors are merely examples, and it is equally possible to devise evaluation factors for the other structural elements of the recording/reproducing means (for example the traverse mechanism of the head, the focus/tracking mechanism, etc.). Of these wear evaluation factors L for the recording/reproducing means, the evaluation factors L to be applied are selected as suitable, the wear factors are set for all recording/reproducing means using the selected L, and the usage history can be established by updating the wear evaluation values every time a recording/reproducing means is used. It should be noted that a method can be applied where the magnetic head wear evaluation value is separated into a magnetic head recording wear evaluation value and a magnetic head reproducing evaluation value.

If the number of usages guaranteed by the maker, which contains a security factor, is used for the wear factors of the recording/reproducing means, recording or reproducing with a high reliability is possible within the number of times guaranteed by the maker. It eliminates problems, for example, that when a backup of information stored on a computer's hard disk is made, after the long processing time for the backup, an instruction is given out that there was a problem with the backup operation, or that when recording is performed due to the programming, recording of the programmed programs fails due to some trouble with the recording/reproducing apparatus.

Furthermore, with the recording/reproducing apparatus of the present invention, in which the control is performed based on the usage history of the recording/reproducing means, it is possible to apply a usage method, which issues a warning when one of the recording/reproducing means has been used more times than guaranteed by the maker, the warning is ignored and the recording/reproducing means is used to the usage limit. In this case, the reliability is somewhat downgraded, but the lifetime of the recording/reproducing means can be extended to the usage limit of the recording/reproducing means. This case can be adopted by substituting the wear factors with the usage limits of the structural elements, or setting two kinds, namely the number guaranteed by the maker and the usage limit. For example, if the information signal or the information content on the information medium is not very important, then the recording/reproducing is performed with a recording/reproducing means at the limit or beyond the limit, and when the information is important, then the recording/reproducing is performed with a recording/reproducing means within the number guaranteed by the maker, which prolongs the lifetime of the recording/reproducing apparatus.

As an example of a recording/reproducing apparatus of the present invention, when N recording/reproducing means with the same recording/reproducing principle are used, the wear evaluation value of the tray transfer mechanism for example is adopted as the usage history, the number guaranteed by the maker is 200,000 usages of the tray transfer mechanism, and the usage limit number is 2,000,000 usages, then the following wear evaluation value results. If the wear factor of the tray transfer mechanism is expressed as $1/20,000$ according to the number guaranteed by the maker, and as $1/200,000$ according to the usage limit number, then the tray transfer wear evaluation value of the n-th of the N recording/reproducing means is $L_{in}(n)=n_{in}n \times 1/20,000$ (for the number guaranteed by the maker) or $L_{in}(n)=n_{in}n \times 1/200,000$ (for the usage limit number) (wherein $1 \leq n \leq N$). As long as the wear evaluation value of the n-th recording/reproducing means satisfies the condition $L_{in}(n) \leq 1$, the tray transfer mechanism of the n-th recording/reproducing means is used. Until the transfer number becomes 20,000 for all N recording/reproducing means, the tray transfer mechanisms of the recording/reproducing apparatus are used within the guarantee of the maker. That is to say, 20,000×N operations of recording/reproducing an information medium can be performed, and if the tray transfer mechanisms of the recording/reproducing means are used to the limit, then 200,000×N recording/reproducing operations can be performed with information recording media.

With the control of the conventional example, on the other hand, when one of the N recording/reproducing means has been used up to 20,000 times, the tray transfer operation is inhibited to operate and the entire recording/reproducing apparatus becomes inoperable. The reason is that even if one of the N recording/reproducing means is used more than 20,000 times, the reliability decreases. In that case, there is the possibility that some kind of trouble occurs when loading with the tray, and the recording/reproducing operation cannot be performed properly, or that the information medium is damaged. Further, the conventional example may be configured in a manner that the operation is possible for the number exceeding that guaranteed by the maker, but when the usage limit of 200,000 times is reached, the tray transfer is inhibited to operate and the entire recording/reproducing apparatus becomes inoperable.

In other words, with the conventional apparatus, the number of operations that can be guaranteed by the maker is between 200,000 and 200,000×N, but in practice, 200,000×N usages are impossible. On the other hand, with the recording/reproducing apparatus of the present invention, 200,000×N usages can be reached, and the same can be said for the usage limit.

Modifying the inventive idea of selecting the recording/reproducing means based on information relating to the usage history of the recording/reproducing means in order to keep the usage history of the recording/reproducing means equal, it is also possible to perform recording/reproducing operations especially with a specific recording/reproducing means, and to use another recording/reproducing means when this specific recording/reproducing means has reached its operation limit. Alternatively, in techniques for optically recording/reproducing information signals on an information medium using a laser light source, reproduction usually is performed as well when recording, and considering that the lifetime for recording is shorter than that for reproducing, if a certain recording/reproducing means is used when recording the information medium and if this recording/reproducing means reaches the recording limit, but has not yet reached the reproducing limit, it is possible to dedicate this recording/reproducing means to reproduction, and use another recording/reproducing means for recording.

Figure 5:
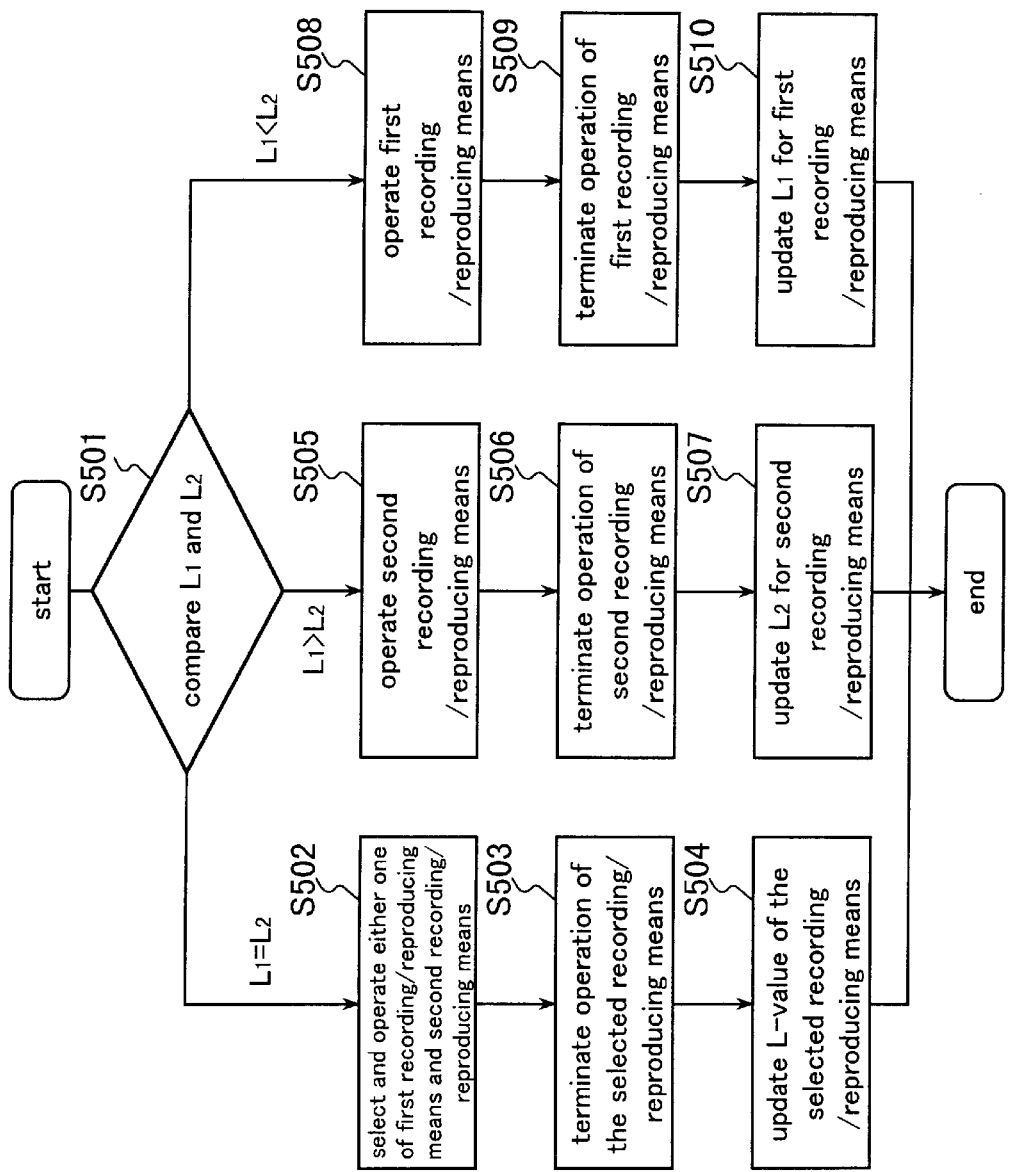
FIG. 5 is a flowchart showing a transfer method for a recording/reproducing apparatus of an embodiment of the present invention.

The following is an explanation of a transfer method for a recording/reproducing apparatus of the present invention. FIG. 5 is a flowchart showing one embodiment of a transfer method of the present invention. In FIG. 5, the present invention is realized with a recording/reproducing apparatus having two recording/reproducing means, but the same idea can be applied to apparatuses with three or more recording/reproducing means as well.

First of all, before inserting an information medium into the transfer means, the wear evaluation value $L_1$ of the first recording/reproducing means is compared with the wear evaluation value $L_2$ of the second recording/reproducing means (Step S501). If $L_1$ is larger than $L_2$, (i.e., if the usage history of the first recording/reproducing means is longer than that of the second recording/reproducing means), the information medium is transferred to the second recording/reproducing means, and recording or reproducing is performed with the second recording/reproducing means (Step S505). After the operation is finished (Step S506), the wear evaluation value $L_2$ of the second recording/reproducing means is updated (Step S507), and the information medium can be retrieved from the recording/reproducing apparatus, if necessary. Similarly, if $L_2$ is larger than $L_1$, the first recording/reproducing means is used (Steps S508, S509), and the wear evaluation value $L_1$ of the first recording/reproducing means is updated (Step S510). If the usage histories of the first recording/reproducing means and the second recording/reproducing means are identical (for example, when the recording/reproducing apparatus is used for the first time), either one of the first and the second recording/reproducing means is used (Steps S502, S503), and the wear evaluation value ($L_1$ or $L_2$) of the used recording/reproducing means is updated (Step S504).

In the flowchart in FIG. 5, the wear evaluation values of the usage history of the recording/reproducing means can be calculated, for example, with the usage history judgement means 13, 14, or 15 shown in FIGS. 2 to 4. That is to say, a wear evaluation circuit or a wear evaluation software can be built into the usage history judgement means 13, 14, or 15.

Thus, because a recording/reproducing apparatus of the present invention includes a plurality of recording/reproducing means, and because the selection of the recording/reproducing means for recording/reproducing an information medium is based on the usage histories of the recording/reproducing means, the lifetime of the recording/reproducing apparatus can become as long as the combined lifetime of these recording/reproducing means, thereby prolonging the lifetime of the recording/reproducing apparatus.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A recording/reproducing apparatus comprising:
   a plurality of recording and/or reproducing means for performing at least one of recording an information signal and reproducing an information signal;
   a medium transfer means for transferring an information medium and loading it selectively into one of said recording and/or reproducing means;
   a selection means for selecting the recording and/or reproducing means to be loaded with the information medium by said medium transfer means;
   wherein said selection means selects the recording and/or reproducing means with the currently shortest usage history from said plurality of recording and/or reproducing means.

2. The recording/reproducing apparatus according to claim 1, further comprising a storage means for storing the usage history of each of the recording and/or reproducing means.

3. The recording/reproducing apparatus according to claim 2, further comprising a judgement means for judging, based on the usage histories stored in the storage means, which recording and/or reproducing means is to be selected with the selection means.

4. The recording/reproducing apparatus according to claim 1, further comprising a medium stocking means for stocking a plurality of information media; and
   a moving means for moving one desired information medium of the plurality of information media from said medium stocking means to said medium transfer means.

5. The recording/reproducing apparatus according to claim 4, further comprising a medium selection means for selecting, from said medium stocking means, an information medium used for recording certain information with a selected recording and/or reproducing means, the selecting being in accordance with a kind of the information.

6. An information medium transfer method for transferring an information medium to load it selectively into one of a plurality of recording and/or reproducing means for performing at least one of recording an information signal and reproducing an information signal, the method comprising:
   comparing, with a usage history judgement means, usage histories obtained from a storage means for storing usage histories of the recording and/or reproducing means;
   selecting, with a selection means, one of the plurality of recording and/or reproducing means, which said usage history judgement means has judged to have the shortest usage history; and
   transferring the information medium with a transfer means to the recording and/or reproducing means selected with the selection means.

* * * * *